United States Patent [19]

Ruof

[11] 4,327,413
[45] Apr. 27, 1982

[54] AUTOMATIC BRAKE CONTROL CIRCUIT FOR AIRCRAFT

[75] Inventor: Edgar J. Ruof, Akron, Ohio

[73] Assignee: Goodyear Aerospace Corporation, Akron, Ohio

[21] Appl. No.: 74,691

[22] Filed: Sep. 12, 1979

[51] Int. Cl.³ .............................................. B60T 8/12
[52] U.S. Cl. .................................. 364/426; 244/111; 303/93
[58] Field of Search .................... 364/426; 303/93, 97, 303/109; 244/111; 318/592, 611

[56] References Cited

U.S. PATENT DOCUMENTS

| | | | |
|---|---|---|---|
| 3,555,391 | 1/1971 | Younkin | 318/611 X |
| 3,829,167 | 8/1974 | Ruof et al. | 303/93 |
| 3,856,365 | 12/1974 | Steigerwald et al. | 303/93 |
| 3,920,278 | 11/1975 | Hirzel et al. | 303/93 |
| 4,007,970 | 2/1977 | Romero | 303/93 |
| 4,105,258 | 8/1978 | Bornfleth | 303/93 |
| 4,120,540 | 10/1978 | Devlieg | 303/93 X |

*Primary Examiner*—Jerry Smith
*Attorney, Agent, or Firm*—P. E. Milliken; E. W. Oldham; R. L. Weber

[57] ABSTRACT

A circuit incorporated in a braking system for allowing a pilot to select a desired rate of deceleration and to cause the aircraft, upon landing, to achieve and maintain the selected deceleration rate. Fundamentally, the circuit includes a selector switch for selecting the desired rate of deceleration and uses a linear decelerometer signal having an output corresponding to the instantaneous rate of actual deceleration of the aircraft. Comparator circuitry compares the actual and desired rates of deceleration and provides an error signal to high and low rate circuits which charge a storage capacitor which in turn, through a buffer and power drive circuitry, regulates the associated control valve. When the difference between the actual and desired rates exceeds a particular level, the high rate circuit controls the charging of the capacitor. The low rate circuit operates when the difference between the actual and desired rates is below the particular level, and is operative to cause the actual rate of deceleration to asymptotically approach the desired rate. There is also included an initialization circuit for quickly filling the brake cavities to initiate the braking operation.

9 Claims, 1 Drawing Figure

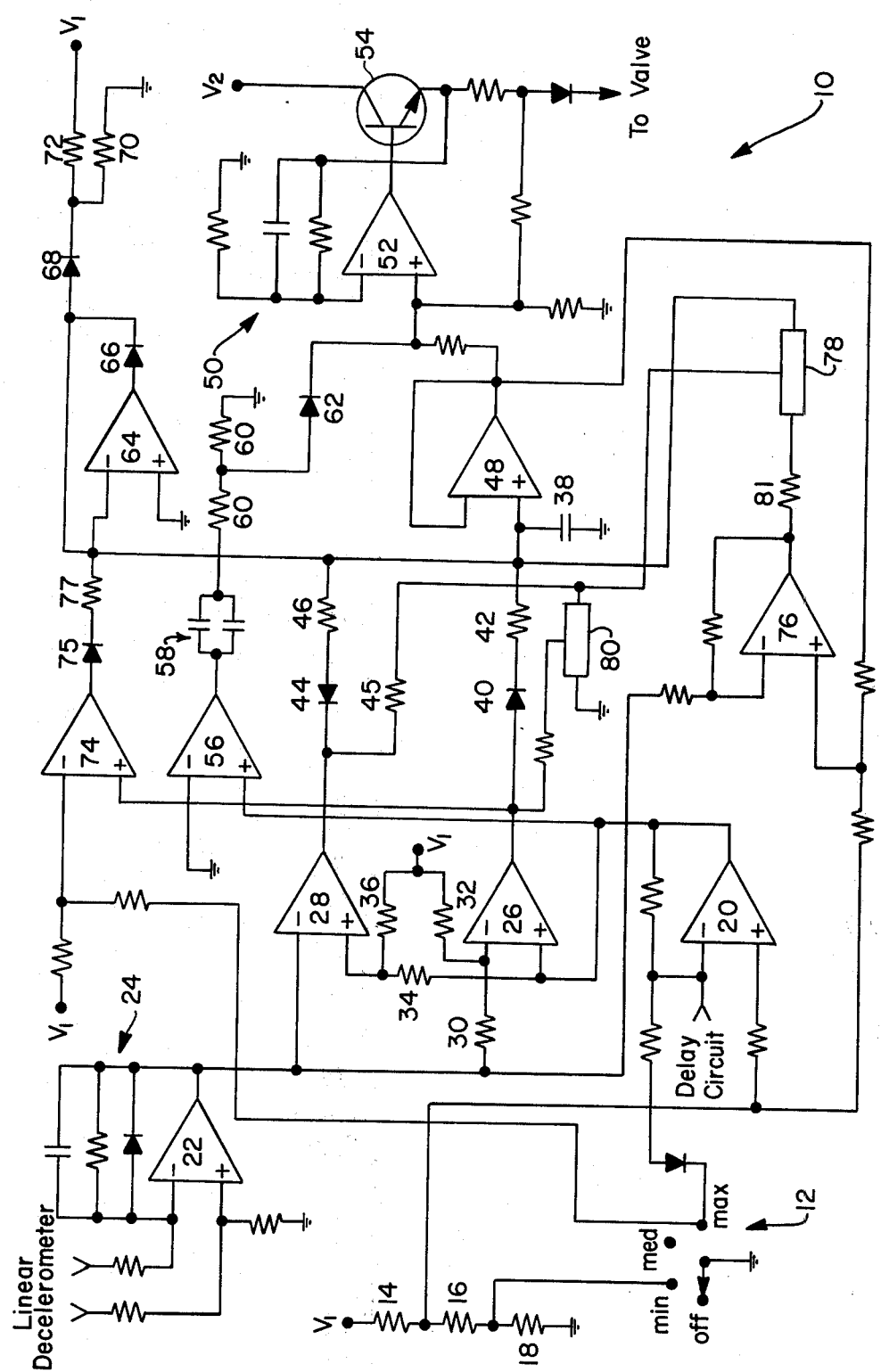

AUTOMATIC BRAKE CONTROL CIRCUIT FOR AIRCRAFT

BACKGROUND OF THE INVENTION

The invention herein resides in the art of brake control systems for aircraft and is particularly related to those systems incorporating automatic deceleration control or automatic braking functions. It will be appreciated herein that the instant invention, while being discussed with respect to aircraft, is applicable to any braked wheel vehicle. Similarly, it will be readily appreciated by those skilled in the art that the instant invention may be incorporated into brake control systems which utilize state-of-the-art antiskid systems, in which case the instant invention will be utilized for metering the appropriate brake pressure in lieu of manual operation of the main brake pressure control valve. In the hydraulic system of an aircraft utilizing the invention, a shuttle valve would be interposed between the manually controlled brake pedals of the pilot and the control circuit described herein. That source demanding the greater braking effort will control, via the shuttle valve. Of course, antiskid circuitry may still be included with each of the braked wheels.

For a general understanding of certain of the benefits of automatic braking systems, reference may be had to U.S. Pat. No. 3,829,167, to the applicant herein and Harold R. Booher. In the system of that patent, the actual rate of deceleration hunts about a desired rate of deceleration as evidenced by the control signals shown in FIG. 3 thereof. While the patented system has proven to be a very satisfactory one, this hunting technique has been found to be less desirable than a system in which the actual deceleration rate seldom overshoots the desired rate. By alleviating the hunting technique, it has been found that the braking effort is more efficient and more conducive to passenger comfort.

ASPECTS OF THE INVENTION

In light of the foregoing, a first aspect of the instant invention is the provision of an automatic braking system for aircraft in which the actual rate of deceleration may essentially be held at the desired rate of deceleration, eliminating the hunting technique of the prior art.

In accordance with another aspect of the invention, there is presented an automatic braking system for aircraft wherein the actual rate of deceleration asymptotically achieves a pilot-selected desired rate of deceleration.

Further, in accordance with an additional aspect of the invention there is provided an automatic braking system for aircraft which allows a rapid linear increase in actual deceleration to a particular level of deceleration determined by the selected rate, after which there is an asymptotic approach of the actual deceleration rate to that which has been selected.

In accordance with yet another aspect of the invention, there is provided an automatic braking system for aircraft which is reliable in operation, readily adaptable for implementation with presently existing aircraft braking systems, and which, for the benefits to be derived, is relatively inexpensive to construct.

SUMMARY OF THE INVENTION

The foregoing and other aspects of the invention which will become apparent as the detailed description proceeds are achieved by a control circuit for use in an automatic braking system for an aircraft, comprising: selection means for selecting a desired rate of deceleration and producing a first output signal corresponding thereto; deceleration sensing means for producing a second output signal corresponding to the actual rate of deceleration; and valve control means connected to said selection means and said second signal means for controlling brake pressure and forcing said actual rate of deceleration to asymptotically approach said desired rate of deceleration.

DESCRIPTION OF DRAWING

For a complete understanding of the aspects and techniques of the invention, reference should be had to the following detailed description and accompanying drawing wherein there is shown a schematic diagram of the control circuitry of the invention showing the interconnection of the same between an aircraft decelerometer and the control valve.

DETAILED DESCRIPTION OF PREFERRED EMBODIMENT

Referring now to the drawing, it can be seen that an automatic braking system and the control circuitry therefor is designated generally by the numeral 10. The circuit includes a pilot controlled actuation switch 12 which, in the OFF position shown is operative through a second deck of the switch 12 to disconnect the power sources V1 and V2 to the circuitry. The switch 12 is operative for selecting any one of three deceleration rates designated by MIN, MED, and MAX. As can be seen, the switch 12 is interconnected with a voltage divider comprising resistors 14–18 interconnected between the voltage source V1 and ground. This voltage divider supplies a voltage of selected amplitude to an amplifier 20 and, as would be appreciated by those skilled in the art, such voltage divider and the switch 12 could easily be replaced by a rheostat or appropriate variable resistor or potentiometer. In any event, the amplifier 20 receives a signal at the positive input thereof corresponding to a desired rate of deceleration selected by the switch 12. As will be discussed hereinafter, the negative input may receive a signal from a delay circuit which would be operative for keeping the output of the amplifier 20 at a low level until the wheels of the landing aircraft have spun up. Such delay circuitry is well known to those skilled in the art and can comprise a simple RC network actuated by the aircraft squat switch. In any event, once the delay circuit signal is removed, the output of the amplifier 20 is a signal of a fixed level corresponding to the selected rate of deceleration.

An amplifier 22 is appropriately connected to a linear decelerometer which, as is known to those skilled in the art, now comprises part of the navagational equipment on most aircraft. The output of the decelerometer is a DC signal of an amplitude corresponding to the instantaneous deceleration of the aircraft. Such decelerometers now comprise state-of-the-art equipment and, indeed, could be of the nature utilized in the circuitry of U.S. Pat. No. 3,829,167. Connected in a feedback network across the amplifier 22 is the circuit 24 which provides appropriate filtering and scaling of the decelerometer signal. Suffice it to say that the output of the amplifier 22 is a DC signal of an amplitude corresponding to the instantaneous rate of deceleration and scaled in accordance with the output of the amplifier 20.

Comparator circuits 26,28 receive the outputs of the amplifiers 20,22. The comparator or amplifier 26 receives at the positive input thereof the signal corresponding to the desired rate of deceleration while the negative input receives a signal corresponding to the actual rate of deceleration biased by the voltage divider 30,32. Accordingly, the amplifier 26 presents a positive output so long as the desired rate of deceleration exceeds the actual rate of deceleration by a fixed level. In a preferred embodiment of the invention, the resistors 30,32, comprising a voltage divider at the negative input, are selected such that amplifier 26 provides a positive output so long as the desired rate of deceleration exceeds the actual rate by 0.75 ft/sec$^2$. Correspondingly, the amplifier 28 is provided with the negative input receiving the actual rate of deceleration and the positive input receiving the desired rate biased by the voltage divider 34,36. Accordingly, the output of the amplifier 28 is at a high level unless the rate of actual deceleration exceeds the selected rate by an amount provided by the biasing of the voltage divider 34,36. In effect, and as will be discussed hereinafter, the amplifier 28 provides for the discharging of the capacitor 38 if a lower rate of deceleration is selected via the switch 12 during operation.

When the desired rate of deceleration exceeds the actual rate by a predetermined level, the high output of the amplifier 26 charges the capacitor 38 at a near linear rate through the diode 40 and resistor 42. Of course, the elements 42,38 operate as a typical RC network, but only the initial part of the charging curve is used. Similarly, when the output of the amplifier 28 is low, the capacitor 38 may discharge through the resistor 46 and diode 44. It will be appreciated that since the amplifiers 26,28 have no electrical feedback, they operate to instantaneously effectuate a change at the capacitor 38. Specifically, the amplifier 26 operates to charge the capacitor 38 in the linear range of the RC network 42,38 to a point where the actual and desired rates of deceleration are within a particular range of each other, at which point amplifier 76 is allowed to take control. The charge on the capacitor 38 operates as a valve control signal through the buffer 48 to control the valve driver circuit 50. The circuit 50 is somewhat standard in the art, operating through the amplifier 52 and transistor 54 to provide a current to the control valve proportional in amplitude to the signal maintained on the capacitor 38. This current operates to apply brake pressure; that is, increasing current results in increasing pressure to the brakes.

As shown, an amplifier 56 is provided with the positive input thereof connected to the output of the amplifier 20. Upon termination of the signal from the delay circuit, with the resultant positive going output from the amplifier 20, a short duration pulse is created by the amplifier 56 via the capacitors 58 and resistors 60. Of course, the duration of that pulse is determined by such resistors and capacitors and the same is transferred via the diode 62 to the amplifier 52 of the valve driver 50. Accordingly, there is a short duration current pulse provided to the valve to fill the brake cavities immediately upon the institution of operation of the circuit 10. Accordingly, there is little or no hydraulic lag in the initial operation of the automatic braking system.

It will also be noted that the capacitor 38 is connected to a clamp comprising amplifier 64 and feedback diode 66. The clamp 64,66 operates to limit the low voltage of the capacitor 38 to ground as a referenced starting point until initialization of the braking system by removal of the delay signal. Hence, when the output of the amplifier 20 goes to its selected high level, the capacitor 38 may begin charging from ground as its reference, providing for reliable and repeatable operation. The diode 68 and the voltage divider 70,72 limit the maximum voltage of capacitor 38.

It will be appreciated that when MIN is selected by the switch 12, the voltage level of the amplifier 20 is determined by a voltage divider comprising resistors 14,16. When the medium level of deceleration is selected via MED on the switch 12, the signal of the amplifier 20 is determined by a voltage divider comprising resistors 14–18. When the maximum deceleration rate is desired, charging of the capacitor 38 is accelerated by parallel operation of the amplifier 74 with the amplifier 26. As can be seen, selection of MAX by the switch 12 drops the negative input of the amplifier 74 with the positive input thereof being at a high level whenever the output of the amplifier 26 is at a high level. Accordingly, the amplifier 74 conducts to charge the capacitor 38 through the diode 75 and resistor 77, accelerating the charging rate so as to more quickly reach the maximum deceleration level.

An amplifier 76 is interconnected as a difference amplifier to receive the actual deceleration signal from the output of the amplifier 22 and the desired deceleration signal from the voltage divider 14–18. The output of the amplifier 76 is thus an error signal corresponding to the difference between the desired and actual rates. This signal is selectively passed via the bilateral switch 78 to the capacitor 38. Gating of the bilateral switch 78 is controlled by the output of the amplifier 28. However, this output may be shunted by means of the bilateral switch 80 which is gated by the output of the amplifier 26. Thus, when the output of the amplifier 26 is high, indicating rapid linear charging of the capacitor 38, the output of the amplifier 28, through resistor 45 for control of switch 78, is shunted through the switch 80 to ground and the switch 78 is thus nonconductive. However, when the output of the amplifier 26 goes low as discussed above, the high level output of amplifier 28 will gate the switch 78 into conduction, applying the output of amplifier 76 to charge the capacitor 38 via the resistor 81. With the amplifier 76 being a difference amplifier, the charge on the capacitor 38 is regulated by the error signal to asymptotically approach a value which produces the desired rate of deceleration. The error signal functions to maintain constant deceleration in the face of changing aerodynamic drag, brake fade, and the like.

In operation, upon touchdown there is instituted a time delay which, in a preferred embodiment of the invention, is a three second delay begun upon actuation of the squat switch. During this time delay, the output of amplifier 20 is held at a low level due to the high level presented at the negative input thereof. When this hold-off signal from the delay circuit is removed after the time delay, the output of the amplifier 20 becomes a DC voltage representative of the desired rate of deceleration as selected via the switch 12. At the same time, the output of the amplifier 22 is a DC voltage corresponding to the instantaneous rate of deceleration of the aircraft.

At the instant the delay signal terminates and the output of the amplifier 20 goes to a high level, an initial pulse of valve current is applied to the control valve to give an initial pulse of brake fluid for quick fill of the brake cavities on initial application. This pulse is generated only one time on each landing operation of the automatic brake control circuit by the elements 56-60, with the pulse duration being determined by the respective capacitor and resistor values of the elements 58,60. With the brake cavities filled, rapid response to the control signals generated by the circuit 10 may be achieved.

While the output of amplifier 20 is held low, the output of amplifier 28 is correspondingly held low, discharging capacitor 38 to zero volts, with the amplifier 64 operating as a clamp for that purpose. When the output of the amplifier 20 goes to its selected value at the termination of the delay signal, the outputs of amplifiers 26,28 also go to their high levels, and capacitor 38 begins to charge via amplifier 26 at a relatively linear rate. The buffer 48 sends the voltage of the capacitor 38 to the valve driver 52,54 which sends a proportional current to the automatic braking system valve. As valve current increases, brake pressure and deceleration also increase, which causes the output voltage of amplifier 22 to rise. When this voltage gets within the predetermined threshold of the output of amplifier 20, as set by the resistors 30,32, amplifier 26 turns off with amplifier 28 remaining on. With the output of amplifier 26 going low, the bilateral switch 80 is turned off, which allows the output of amplifier 28 to turn the bilateral switch 78 on. This interconnects the output of the amplifier 76 with the capacitor 38.

When the actual deceleration equals the selected deceleration, the output of amplifier 76 is the same as the voltage on capacitor 38, and the bilateral switch 78 operates as a low impedance bilateral path. With this condition, the voltage of capacitor 38 does not tend to change. However, when the selected and the actual deceleration rates are not equal, the output of amplifier 76 changes by the difference and acts to either increase or decrease the voltage of the capacitor 38, as required. Amplifier 76 provides the fine tuning required to maintain constant deceleration in the operational environment of the aircraft. On the other hand, amplifiers 26 and 28 provide faster changes in the charge on capacitor 38, such as are required in the initial ramp up when the braking effort begins, or when a ramp down is dictated by the pilot selecting a lower deceleration via the switch 12 sometime during the braking operation. It will be understood that when amplifier 26 is causing a ramp up, or amplifier 28 is causing a ramp down of the voltage on capacitor 38, the bilateral switch 78 is turned off and remains off until the actual rate of deceleration is within a predetermined amount of the desired rate.

As mentioned before, amplifier 74 provides a higher ramp rate for the build-up of voltage on the capacitor 38 whenever MAX is selected via the switch 12. When MAX is selected, the negative input on amplifier 74 drops, with the output of amplifier 26 applied to the positive input thereof, driving the output of amplifier 74 high as soon as the delay signal is removed. This output, in parallel with the output of amplifier 26, charges the capacitor 38 via the diode 75 and resistor 77 to achieve rapid charging of the capacitor 38 and thus to quickly reach maximum deceleration.

Thus it can be seen that there is provided an automatic brake control circuit for aircraft which allows an operator to select a particular rate of deceleration with the circuit then controlling, by comparison of the actual and selected deceleration rates, the braking of the aircraft. While in accordance with the patent statutes, only the best mode and preferred embodiment of the invention has been presented and described in detail, it is to be understood that the invention is not limited thereto or thereby. Accordingly, for a true appreciation of the scope and breadth of the invention, reference should be had to the following claims.

What is claimed is:

1. A control circuit for use in an automatic braking system for an aircraft, comprising:
   selection means for selecting a desired rate of deceleration and producing a first output signal corresponding thereto;
   deceleration sensing means for producing a second output signal corresponding to the actual rate of deceleration;
   valve control means connected to said selection means and said deceleration sensing means for controlling brake pressure and forcing said actual rate of deceleration to asymptotically approach said desired rate of deceleration, said valve control means comprising a comparator circuit means connected to a valve driver and receiving and comparing said first and second output signals, said comparator circuit means further controlling the charge on a capacitor at selected rates of charging and discharging, said charge presenting a control signal to said valve driver; and
   wherein said valve control means further includes an amplifier interconnected with and controlled by said selection means and said comparator circuit means to charge said capacitor.

2. The control circuit according to claim 1 wherein said valve control means further comprises a difference amplifier receiving said first and second output signals and having an output selectively applied to said capacitor under control of said comparator circuit means.

3. An automatic brake control circuit for a vehicle, comprising:
   selection means for selecting a desired rate of deceleration of the vehicle;
   deceleration detection means for producing an output signal corresponding to the actual rate of deceleration of the vehicle;
   a first comparator connected to said selection and deceleration detection means for producing a first output when said desired rate of deceleration exceeds by a particular amount said actual rate of deceleration;
   a difference amplifier connected to said selection and deceleration detection means for producing a second output corresponding to the difference between said actual and desired rates of deceleration; and
   valve driver control means connected to said first comparator and difference amplifier, receiving said first and second output signals and correspondingly regulating application of brake pressure.

4. The automatic brake control circuit according to claim 3 which further includes a switch connected to and controlled by said first comparator, said switch selectively passing said second output to said control means.

5. The automatic brake control circuit according to claim 4 wherein said switch controls a mutually exclusive application of said first and second outputs to said valve driver control means.

6. The automatic brake control circuit according to claim 3 which further includes an amplifier connected to and controlled by said selection means and first comparator to provide a third output signal to said valve driver control means concurrent with said first output signal.

7. The automatic brake control circuit according to claim 3 which further includes an initialization circuit connected to said valve driver control means and providing a fixed duration pulse to said valve driver control means upon actuation of the automatic brake control circuit.

8. The automatic brake control circuit according to claim 3 which further includes a second comparator connected to said selection and deceleration detection means and providing a third output signal to the valve driver control means when the actual rate of deceleration exceeds said desired rate of deceleration by a predetermined amount.

9. The automatic brake control circuit according to claim 3 wherein said valve driver control means includes a capacitor receiving and being charged by said first and second outputs.

* * * * *